United States Patent
Dockter et al.

(10) Patent No.: US 6,295,605 B1
(45) Date of Patent: Sep. 25, 2001

(54) METHOD AND APPARATUS FOR MULTI-LEVEL SECURITY EVALUATION

(75) Inventors: Michael Jon Dockter, Ft. Myers, FL (US); Joel Frank Farber, San Jose, CA (US); Ronald William Lynn, Gilroy, CA (US); Randal James Richardt, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/150,959

(22) Filed: Sep. 10, 1998

(51) Int. Cl.$^7$ ...................................................... G06F 12/14
(52) U.S. Cl. ........................................... 713/166; 713/200
(58) Field of Search ..................................... 713/200, 201, 713/202, 166, 165, 193

(56) References Cited

U.S. PATENT DOCUMENTS

| | | | |
|---|---|---|---|
| 5,075,884 | * 12/1991 | Sherman et al. | ...................... 364/230 |
| 5,345,549 | 9/1994 | Appel et al. | . |
| 5,481,700 | 1/1996 | Thuraisingham | . |
| 5,485,409 | 1/1996 | Gupta et al. | . |
| 5,504,814 | 4/1996 | Miyahara | . |
| 5,539,906 | 7/1996 | Abraham et al. | . |
| 5,572,673 | 11/1996 | Shurts | . |
| 5,604,490 | 2/1997 | Blakely, III et al. | . |
| 5,706,452 | 1/1998 | Ivanov | . |
| 5,796,825 | * 8/1998 | McDonnal et al. | ...................... 380/4 |
| 5,832,228 | * 11/1998 | Holden et al. | .......................... 709/229 |
| 5,940,591 | * 8/1999 | Boyle et al. | .......................... 713/201 |

* cited by examiner

Primary Examiner—James P. Trammell
Assistant Examiner—Pierre E Elisca
(74) Attorney, Agent, or Firm—Ohlandt, Greeley, Ruggiero & Perle, LLP; Ingrid M. Foerster, Es

(57) ABSTRACT

The security evaluation method of the invention utilizes multiple levels of security evaluation before certain user's can gain access to system resources. Upon receiving a user access request, the method acquires qualification data regarding the access request and determines a security level that is applicable to a selected system resource which is indicated by the user access request. Thereafter, the method performs at least one of a plurality of security tests to determine if the qualification data matches the security level applicable to the selected system resource. At least some of the plurality of security tests are arranged to be performed in an order of speed of execution, with a fastest executable security evaluation test being performed first and a slowest executable security test being performed last. A more slowly executable security test is performed with respect to the user access request only if all faster executable security tests return "don't know", or equivalent, responses. The method enables the speed of execution ordering to be overridden if a further system constraint will enable another ordering to maximize system performance.

30 Claims, 1 Drawing Sheet

METHOD AND APPARATUS FOR MULTI-LEVEL SECURITY EVALUATION

FIELD OF THE INVENTION

This invention relates to multi-level security systems for protecting various computer system resources from unauthorized access and, more particularly, to a method and apparatus for executing a multi-level security system which unifies various security systems to create a security evaluation which utilizes the best aspects of each security system.

BACKGROUND OF THE INVENTION

Many methods of computing system security exist. Examples include: access control lists, public/group/private access, User ID, password, etc. Basically all such security methods answer the same question: "May this action happen, yes or no?"

In answering this question, each security method has it own strengths and weaknesses. Some are low in function, high in speed. Others are high function, but are more computationally intense. Some are quick to allow an action, but slow to deny an action. The latter is sometimes known as "early acceptance".

Other security systems will deny a request quickly, but allow a request slowly (also known as "early rejection"). No single-level security system does everything equally well. Today, many computer systems are incorporating multi-level security systems to cope with the many user types who must have access to various system resources. Execution of such multi-level security systems can require substantial system resources and reduce system operating efficiencies.

The prior art includes a variety of teachings regarding security systems for protecting various types of data. For instance, U.S. Pat. No. 5,539,906 to Abraham et al. (assigned to the same Assignee as this application) describes a security system which protects data pertaining to an industrial process (or a series of industrial process steps). Abraham et al. enable access to data that derives from a process step which is currently active, but only to a select group. Thus, access to the process data is prevented, based on the status of the data, in addition to the category or type of data. For instance, users may have access to data elements at some steps in the process, but are denied access to those data elements at other steps in the process. Abraham et al. further suggest that their method for controlling security based on the data status and location may be used with password control, security level control and other classifications based on groups of users or type of data.

U.S. Pat. No. 5,504,814 to Miyahara describes a computer security mechanism that includes an access control table that specifies predetermined access rights of each of a plurality of predetermined security subjects relative to predetermined security objects. The access control table further includes a collection of mutually exclusive execution domains for each of the security subjects so that the executing processes of the security subject can only directly access code and data contained within the collection of domains of such security subject.

U.S. Pat. No. 5,075,884 to Sherman et al. describes a multi-level secure work station wherein each of a select group of processes is displayed only through a suitably labeled window. Access to the window requires access through a previous security-qualified physical signal path. U.S. Pat. No. 5,481,700 to Thuraisingham describes a multi-level security system for a database wherein security constraints are assigned, as security levels, to the data contained in the database. The system further lists users who are cleared to different security levels and are thereby enabled to query various aspects of the multi-level database. Access to the multi-level database is enabled by processing of queries in accord with the security constraints and in accordance with stored rules.

Notwithstanding the teachings in the prior art regarding multi-level security systems, there is still a need for such a security system which arrives at an "early acceptance" or "early rejection" conclusion in regards to an access request, in a minimal amount of time and through use of minimal processing assets.

Accordingly, it is an object of this invention to provide a multi-level security evaluation system for a computer which reaches either an early acceptance or an early rejection of an access request in a minimal amount of processing time.

It is a further object of this invention to provide a multi-level security evaluation system for a computer, wherein the computer is enabled to perform the multi-level security evaluations in any order which maximizes system performance.

It is another object of this invention to provide a security evaluation system, wherein a "don't know" result of an evaluation causes a next security evaluation test to be applied or, if all such tests have been exhausted, a rejection of an access request to a system resource.

SUMMARY OF THE INVENTION

The security evaluation method of the invention utilizes multiple levels of security evaluation before certain user's can gain access to system resources. Upon receiving a user access request, the method acquires qualification data regarding the access request and determines a security level that is applicable to a selected system resource which is indicated by the user access request. Thereafter, the method performs at least one of a plurality of security tests to determine if the qualification data matches the security level applicable to the selected system resource. At least some of the plurality of security tests are arranged to be performed in an order of speed of execution, with a fastest executable security evaluation test being performed first and a slowest executable security test being performed last. A more slowly executable security test is performed with respect to the user access request only if all faster executable security tests return "don't know", or equivalent, responses. The method enables the speed of execution ordering to be overridden if a further system constraint will enable another ordering to maximize system performance.

BRIEF DESCRIPTION OF THE DRAWINGS

The FIGURE is a high level block diagram of a computer system that is adapted to carry out the method of the invention.

DETAILED DESCRIPTION OF THE INVENTION

Figure 1:
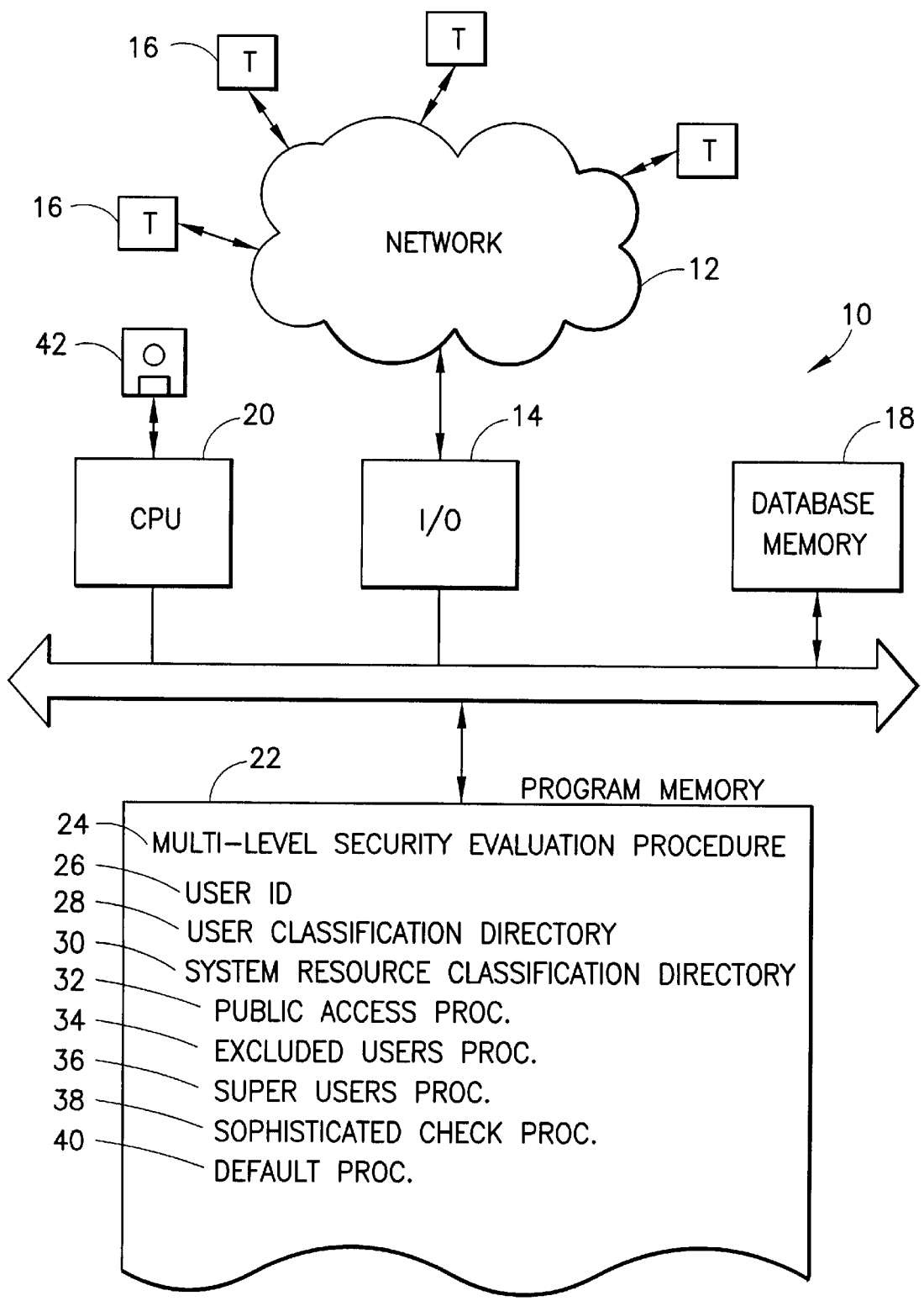

Referring to the FIGURE, a computing system 10 is coupled to a network 12 via an input/output (I/O) module 14. Each of a plurality of terminals 16 is enabled to access, via network 12 and I/O module 14, data that is stored within a database memory 18 in computing system 10. A central processing unit (CPU) 20 controls overall operations of computing system 10 and operates in conjunction with programs and data stored in program memory 22.

Program memory 22 includes a multi-level security evaluation procedure 24 which provides a method for allowing access to a system resource, such as data stored in database memory 18, to users whose assigned security levels match a prior established classification assigned to the system resource. Multi-level security evaluation procedure 24 employs, during its execution, a user identifier (ID) 26 which enables access to a user classification directory 28 that stores one or more security level(s) for the user. A system resource classification directory 30 includes classification levels previously assigned to various system resources and/or objects contained within database memory 18.

Multi-level security evaluation procedure 24 further utilizes a number of single level security systems which, in and of themselves, are independent of other single level security systems. Those single level security systems include the following: public access procedure 32; excluded user's procedure 34;. super-user's procedure 36; sophisticated check procedure 38 and default check procedure 40.

As will be understood from the description below, multi-level security evaluation procedure 24 orders single level security procedures 32–40 in a manner that enables an early acceptance or early rejection of a user's access request, preferably at the earliest time. It is to be further understood that while the procedures to be described below are assumed as already being loaded into program memory 22, they may be resident on a storage media 42, such as a magnetic disk, and loaded into CPU 20 on an as needed basis.

Upon receiving a user request for access to a system resource/object, multi-level security evaluation procedure 24 utilizes the received user ID 26 to access classification directory 28 to retrieve a classification level assigned to the particular user ID. Further, system resource classification directory 30 is accessed to acquire a pre-established classification level for the system resource/object to which access is requested.

The method of the invention capitalizes on the strengths of different security methods in order to minimize the time required to arrive at an "early acceptance" or "early rejection" of a user access request. The method expands the question "May this action happen, yes or no?" to "May this action happen, yes, no, or don't know?" The method further orders the security evaluations to get the quickest "Yes or No" response.

Single-level security systems, by themselves, must always answer the question "May this action happen?" with a yes or a no. Likewise, the method of the invention must ultimately provide a "yes" or "no" answer. However, single-level security evaluation systems executed by multi-level security evaluation procedure 24 are also allowed to answer "don't know". Multi-level security evaluation procedure 24 may also interpret a "yes" or a "no" as a "don't know" response.

To efficiently use single-level security systems, multi-level security evaluation procedure 24 orders them by generally, executing the quickest "early acceptance" and "early rejection" first and progressing through individual single-level security systems to the one which provides the slowest acceptance or rejection. However if a single-level security check is infrequently used, it may be at the end of the order, no matter how quick it is. For example, if accesses to a system by "super users" constitutes 90% of all accesses, a super user security check is done first to optimize system performance. By contrast, if super-user accesses constitute only 5% of system accesses, the super user access check is performed last. Further, if a class of users is assured a response in no more than one second, the security check for that class of users will be performed first, even though there are other security checks that execute faster. Accordingly, security evaluation procedure 24 is set to arrange the security procedure executions from fastest to slowest, unless other system constraints dictate otherwise.

As an example, assume that four different single-level security systems are used. The first is privileged access only (36) for a select class of super-users, the second is a quickly referenced list of "excluded users" (34), the third is "Public access" (32), and the fourth involves "sophisticated" checks (38) which evaluate if a user may perform an action on or with respect to an object or a resource.

Each of these security systems has different functionality, different speed, and different characteristics. The super-user check 36 is very fast, but, for this example, is assumed to be rarely needed. The "excluded users" check 34 is a necessary evil for shutting out annoyance users. The "public access" check 32 enables substantially all users access to the system resource (except perhaps excluded users) and is very quickly executed, but has very little usefulness if a request is not open to the public. The "sophisticated" check 38 is more expensive to perform, but is rich in functionality.

A preferred ordering of the aforesaid single-level security systems is:

"excluded users" check 34,

"public access" check 32

"sophisticated" check 38

"super-user" check 36

The reason for such ordering is: the "excluded users" check 34 blocks out annoyance users from public requests, but doesn't severely penalize the speed of granting public requests; the "public access" check 32 is the quickest to reach an "early acceptance" and may be the majority of the cases; the "sophisticated" check 38 has rich functionality and may require extended processing time. Lastly, the "super-user" check 36, although quick, is assumed to be rarely used and accordingly is placed last so all users need not pay the price of that check.

For this example, the method of the multi-level security evaluation performs the following steps:

The first check is "excluded users" check 34. If the result is to reject the request for access to an object or system resource, the request is rejected. If the result is to grant the request for access, it is treated by multi-level security evaluation procedure 24 as a "don't know" condition.

The second check is the "public check" 32. If the requested object or resource is "publicly available", it is granted. If it is not "public", multi-level security evaluation procedure 24 treats the answer as a "don't know" condition and proceeds to the next security check because subsequent checks may grant or revoke the request.

The third check is "sophisticated" check" 38. If the result is to grant the request for access to an object or system resource, it is granted. If the result is to reject the request, it is treated as a "don't know" condition.

The fourth check is "super-user" check 36. If the result is to grant the request, it is granted. If the result is to reject the request, it is treated as a "don't know" condition.

The "default" check" 40 then returns a result to reject the request. This is the case because the first check was a "public" check. In other cases, the "default" check may grant the request. In a chart form, the processing appears as follows:

| Check # | Security System | Accept | Reject |
| --- | --- | --- | --- |
| 1 | Excluded Users Check | Don't Know | Yes |
| 2 | Public Access | Yes | Don't Know |
| 3 | Sophisticated | Yes | Don't Know |
| 4 | Super-users List | Yes | Don't Know |
| 5 | Default | — | Reject |

Clearly, if other single-level security systems are used, they may be inserted into the order. This may alter the interpretation of the accept/reject responses.

By using the above described technique, various single-level security systems are combined to give the best overall system performance. Multi-level security evaluation procedure 24 is responsible for ordering the single-level security systems and evaluating the meaning of the accept/reject responses in the context of the entire order. Additionally, if a single-level security systems has a weakness, it can "give up" by returning a "don't know" and the next security system in the order will be invoked.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for security evaluation of a request for access to a system resource, wherein multiple levels of security evaluation are applied before certain users can gain access to at least portions of said system resource, said method comprising the steps of:

receiving a user request for access to a selected system resource and acquiring qualification data regarding said request;

determining a security level applicable to said selected system resource;

performing at least one of a plurality of security tests to determine if said qualification data matches said security level applicable to said selected system resource, at least some of said plurality of security tests arranged to be performed in an order which maximizes system performance in a manner to arrive at an earliest acceptance or an earliest rejection of an access request.

2. The method as recited in claim 1, wherein said system performance is maximized by ordering said security tests by speed of execution, with a fastest executable security test performed first and a slowest executable security test performed last, a slower executable security test being performed with respect to said user request only if faster executable security tests return "don't know" or equivalent responses.

3. The method as recited in claim 2, wherein if said fastest one of said security tests determines that said qualification data matches said security level applicable to said selected system resource, no further security tests are performed.

4. The method as recited in claim 3, wherein one said security test is an excluded user test wherein it is determined if said qualification data indicates that said user is or is not one of a class of users to be excluded from said system resource.

5. The method as recited in claim 4, wherein a further said security test is a sophisticated test wherein a plurality of conditions must be tested to determine if said system resource is available in response to said user request access.

6. The method as recited in claim 5, wherein a further said security test is an excluded user test wherein it is determined if said qualification data indicates that said user is one of a class of users to be excluded from said system resource, in which case a denial of access is issued.

7. The method as recited in claim 6, wherein a further said security test is a public access test wherein it is determined if said system resource is available to public access, in which case, access is granted.

8. The method as recited in claim 7, wherein said security tests are performed in a following order: excluded user test; public access test; sophisticated test; and super-user test.

9. The method as recited in claim 8, wherein a last performed test is a default test which denies access to the selected system resource if the slowest executable security test returns a "don't know" or equivalent response.

10. The method of claim 1, wherein said system performance is maximized by ordering said security tests such that a security test that enables access to substantially all users is performed before others of said security tests and such that a rarely used test is performed thereafter.

11. A memory media for controlling a computer to perform a security evaluation of a request for access to a system resource, wherein multiple levels of security evaluation are applied by said computer before certain users can gain access to at least portions of said system resource, said memory media comprising:

a) means for controlling said computer to receive a user request for access to a selected system resource and to acquire qualification data regarding said request;

b) means for controlling said computer to determine a security level applicable to said selected system resource;

c) means for controlling said computer to perform at least one of a plurality of security tests to determine if said qualification data matches said security level applicable to said selected system resource, at least some of said plurality of security tests arranged to be performed in an order which maximizes system performance in a manner to arrive at an earliest acceptance or an earliest rejection of an access request.

12. The memory media as recited in claim 11, wherein means c) maximizes said system performance by ordering said security tests by speed of execution, with a fastest executable security test performed first and a slowest executable security test performed last, a slower executable security test being performed with respect to said user request only if faster executable security tests return "don't know" or equivalent responses.

13. The memory media as recited in claim 12, wherein if said fastest one of said security tests determines that said qualification data matches said security level applicable to said selected system resource, said means c) inhibits said computer from performing further security tests with respect to said user request.

14. The memory media as recited in claim 12, wherein one said security test performed by said computer under control of means c) is a public access test wherein it is determined if said system resource is available to public access, and if yes, means c) enables said computer to grant user access.

15. The memory media as recited in claim 14, wherein a further said security test is an excluded user test performed by said computer under control of means c) wherein it is determined if said qualification data indicates that said user is or is not one of a class of users to be excluded from said system resource.

16. The memory media as recited in claim 15, wherein a further said security test is a sophisticated test wherein a plurality of conditions must be tested by said computer under control of means c) to determine if said system resource is available in response to said user request access.

17. The memory media as recited in claim 16, wherein a further said security test is a super-user test wherein said computer, under control of means c), determines if said qualification data indicates that said user is one of a class of users to be allowed access to a superset of system resources including said requested resource, in which case, access is granted.

18. The memory media as recited in claim 17, wherein means c) controls said computer to perform said security tests in a following order: excluded user test; public access test; sophisticated test; and super-user test.

19. The memory media as recited in claim 18, wherein means c) controls said computer to perform, as a last performed test, a default test which denies access to the selected system resource if the slowest executable security test returns a "don't know" or equivalent response.

20. The memory media of claim 11, wherein said system performance is maximized by ordering said security tests such that a security test that enables access to substantially all users is performed before others of said security tests and such that a rarely used test is performed thereafter.

21. Apparatus for enabling a computer to perform a security evaluation of a request for access to a system resource, by applying multiple levels of security evaluation before certain users can gain access to at least portions of said system resource, said apparatus comprising:
  a) means for receiving a user request for access to a selected system resource and for acquiring qualification data regarding said request;
  b) means for determining a security level applicable to said selected system resource;
  c) means for performing at least one of a plurality of security tests to determine if said qualification data matches said security level applicable to said selected system resource, at least some of said plurality of security tests arranged to be performed in an order which maximizes system performance in a manner to arrive at an earliest acceptance or an earliest rejection of an access request.

22. The apparatus as recited in claim 21, wherein means c) maximizes said system performance by ordering said security tests by speed of execution, with a fastest executable security test performed first and a slowest executable security test performed last, a slower executable security test being performed with respect to said user request only if faster executable security tests return "don't know" or equivalent responses.

23. The apparatus as recited in claim 22, wherein if said fastest one of said security tests determines that said qualification data matches said security level applicable to said selected system resource, means c) inhibits said computer from performing further security tests with respect to said user request.

24. The apparatus as recited in claim 22, wherein one said security test performed by means c) is a public access test wherein it is determined if said system resource is available to public access, and if yes, means c) enables said computer to grant user access.

25. The apparatus as recited in claim 24, wherein a further said security test is an excluded user test performed by means c), wherein it is determined if said qualification data indicates that said user is or is not one of a class of users to be excluded from said system resource.

26. The apparatus as recited in claim 25, wherein a further said security test is a sophisticated test wherein a plurality of conditions must be tested by means c) to determine if said system resource is available in response to said user request access.

27. The apparatus as recited in claim 26, wherein a further said security test is a super-user test, wherein means c) determines if said qualification data indicates that said user is one of a class of users to be allowed access to a superset of system resources including said requested resource, in which case, access is granted.

28. The apparatus as recited in claim 27, wherein means c) controls said computer to perform said security tests in a following order: excluded user test; public access test; sophisticated test; and super-user test.

29. The apparatus as recited in claim 28, wherein means c) performs, as a last performed test, a default test which denies access to the selected system resource if the slowest executable security test returns a "don't know" or equivalent response.

30. The apparatus of claim 21, wherein said system performance is maximized by ordering said security tests such that a security test that enables access to substantially all users is performed before others of said security tests and such that a rarely used test is performed thereafter.

* * * * *